United States Patent [19]
Ellis et al.

[11] Patent Number: 5,809,931
[45] Date of Patent: Sep. 22, 1998

[54] METHOD AND APPARATUS FOR POSITIONING MILKING CLUSTER

[75] Inventors: Michael W. Ellis, Kansas City; Michael W. Thackeray, Lawson, both of Mo.

[73] Assignee: Alfa Laval Agri AB, Tumba, Sweden

[21] Appl. No.: 603,390

[22] Filed: Feb. 20, 1996

[51] Int. Cl.$^6$ .................................................. A01J 5/04
[52] U.S. Cl. ............................................................ 119/14.08
[58] Field of Search ............................... 119/14.1, 14.02, 119/14.08, 14.14

[56] References Cited

U.S. PATENT DOCUMENTS

| Re. 29,848 | 11/1978 | Schluckbier et al. | 119/14.08 |
| 3,690,300 | 9/1972 | Tonelli | 119/14.08 |
| 3,789,798 | 2/1974 | Reisgies et al. | 119/14.08 |
| 3,893,422 | 7/1975 | Schnitzler | 119/14.08 |
| 3,938,470 | 2/1976 | Pace | 119/14.1 |
| 4,034,713 | 7/1977 | Umbaugh | 119/14.02 |
| 4,523,545 | 6/1985 | Kummer | 119/14.08 |
| 4,838,203 | 6/1989 | Ellis et al. . | |
| 5,431,128 | 7/1995 | Nilsson et al. | 119/14.08 |

OTHER PUBLICATIONS

Alfa Laval Agri, Inc. Fall/Winter 1994 Catalog, cover and pp. 1, 62 and 63.
Alfa Laval Agri, Inc. brochure entitled "PLATO The 'Smart' Stall Controller" ©1990, 4 pages.

Primary Examiner—Robert A. Clarke
Assistant Examiner—David J. Cho
Attorney, Agent, or Firm—Hovey, Williams, Timmons & Collins

[57] ABSTRACT

A method and apparatus for automatically positioning a milking cluster at a preselected milking position is provided. A milking cluster is connected to a moveable cylinder which may be retracted at the conclusion of milking. Prior to milking, the moveable cylinder shifts into engagement with a sensor at a location corresponding to the preselected milking position. The movement of the cylinder is halted to locate and maintain the milking cluster at a height predetermined to be generally appropriate for the animals in the herd. The cylinder is counterbalanced to remain at the preselected height, or may be manually adjusted and remain counterbalanced at the adjusted height. At the conclusion of milking, the milking cluster may drop from the animal and cylinder retracted to a retracted position. The apparatus of the invention includes an arm connected to a milking cluster and a moveable member such as a pneumatic cylinder. The pneumatic cylinder is coupled to a sensor and a motor including a pneumatic air logic circuit. The pneumatic cylinder may fall from a second upper position toward a first lowermost position under the influence of gravity until the sensor is engaged at a preselected third milking height. The sensor causes low pressure air to be supplied from the air logic circuit to the cylinder to counterbalance the cylinder and milking cluster at the preselected height. Upon the conclusion of milking, the milking cluster falls free from the animals teats and high pressure air is introduced to retract the cylinder to the second position.

8 Claims, 4 Drawing Sheets

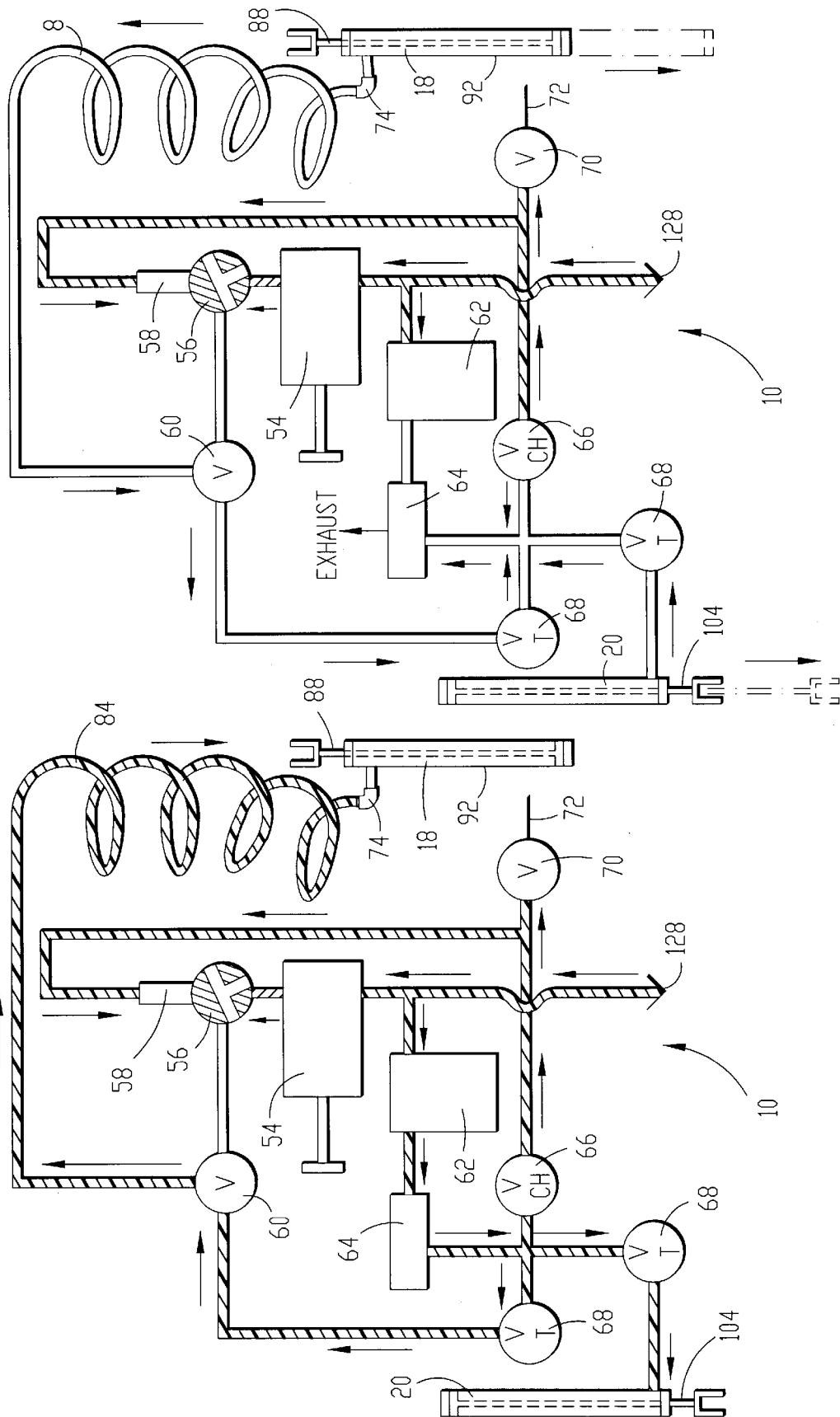

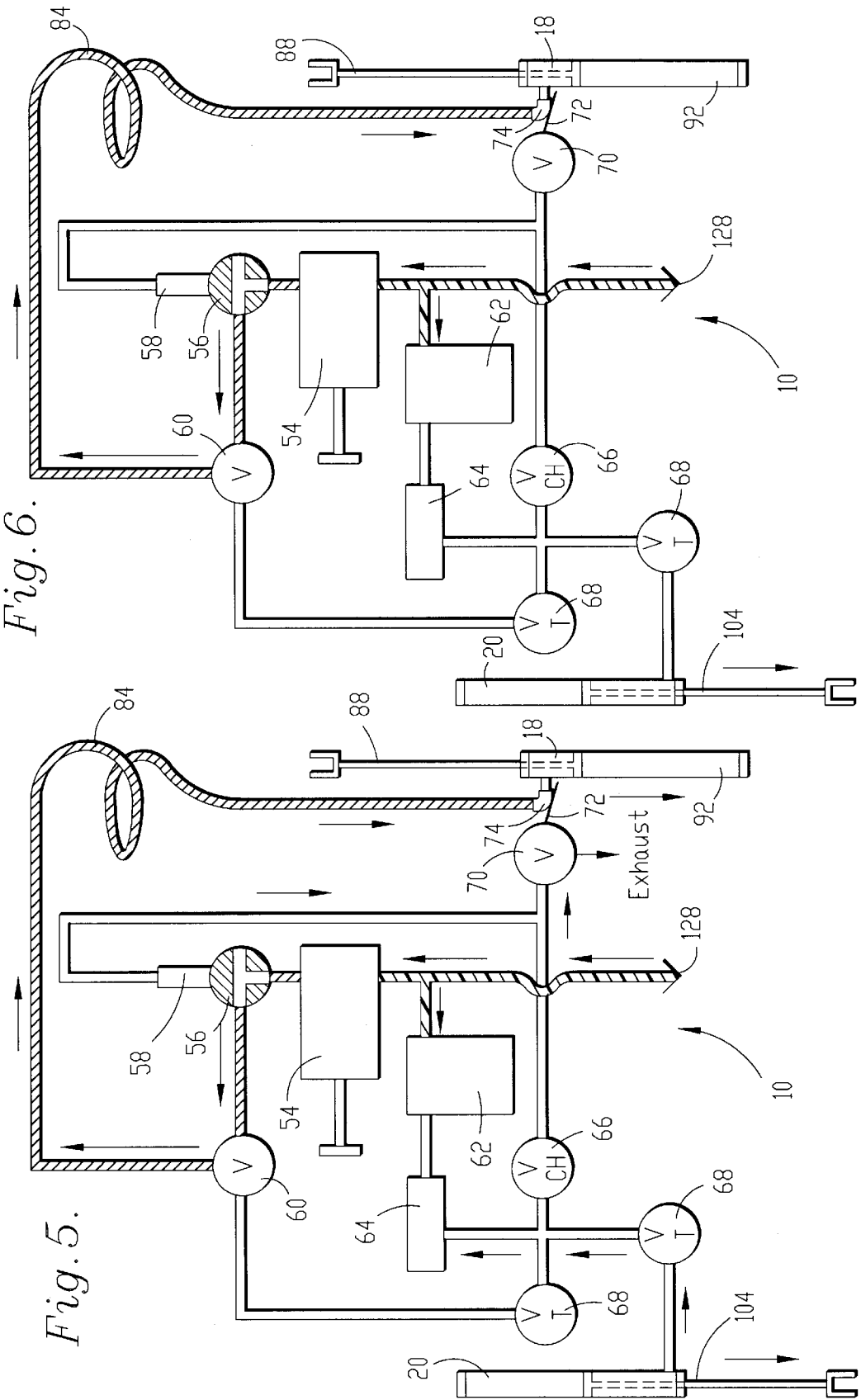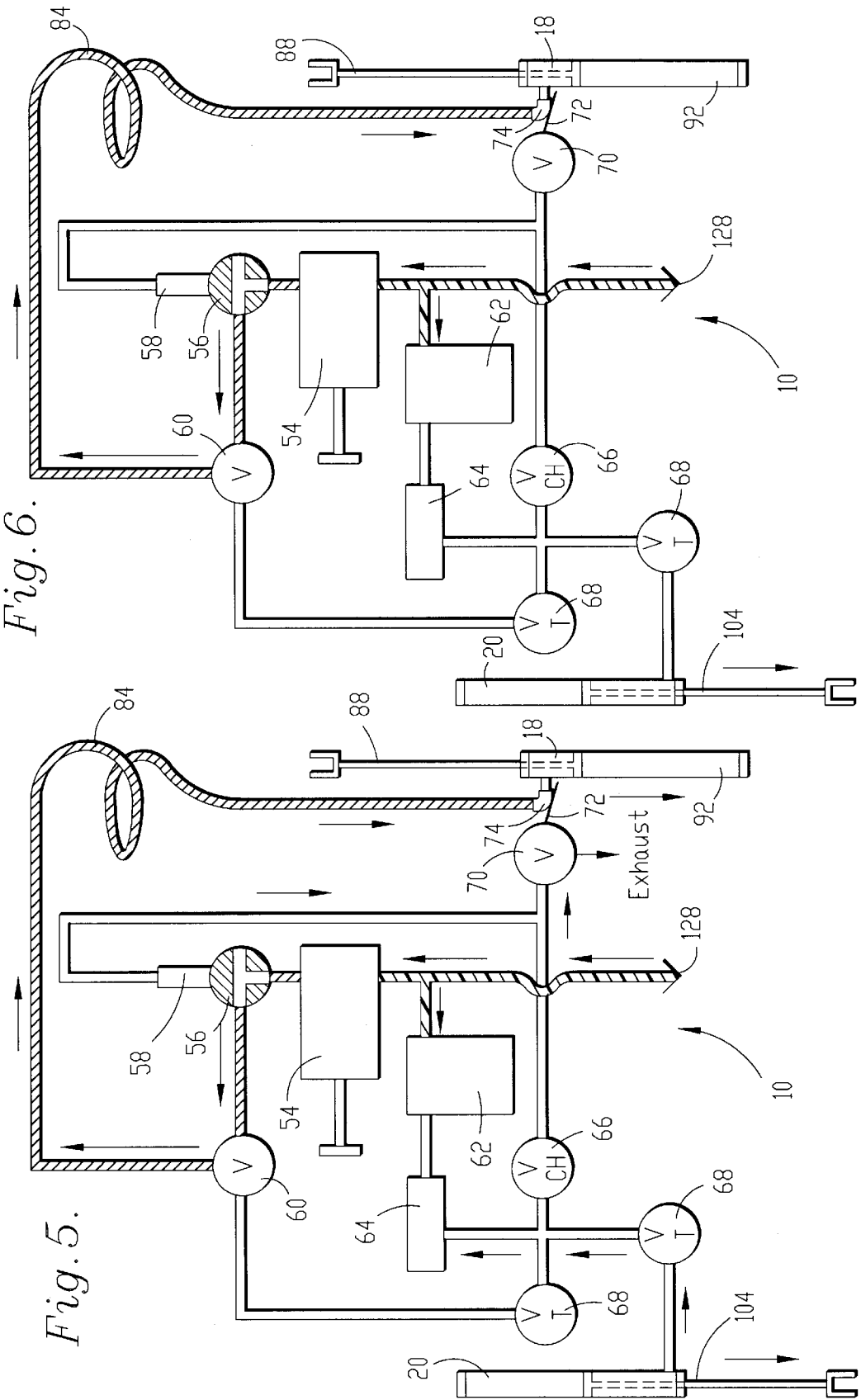

METHOD AND APPARATUS FOR POSITIONING MILKING CLUSTER

BACKGROUND OF THE INVENTION

1. Field of the Invention

This invention concerns a method and apparatus for automatically positioning a milking cluster at a preselected height prior to milking. More particularly, it concerns a method and apparatus whereby the milking cluster is counterbalanced once moving to a milking height, permitting manual adjustment to hold the milking cluster at a final height corresponding to the configuration of a particular cow in the herd.

2. Description of the Prior Art

Dairy operations have continued to grow in size in many parts of the world. Typically, larger dairy farms are concerned with milking cows, although goats and sheep may also be milked. Such large dairy farms endeavor to increase efficiency by milking a larger number of cows with the same or less labor.

One step in increasing dairy efficiency in large farms has been the introduction of automated cluster removal or ACR equipment. This equipment is designed to remove the milking cluster from a cow when the milk flow from the cow ceases. One type of ACR equipment has been cord-type equipment which maintains a tension on the cluster and removes the cluster, when vacuum has declined sufficiently at the teat cups, by continued tension which swings the milking cluster clear and retracts the cord. Another type of ACR equipment has used a hinged arm support. Upon the conclusion of milking, a piston retracts a hinged arm, after cutting off the vacuum to the milking cluster. Continued retraction of the hinged arm causes the teat cups to pull clear of the teats and the cluster is retracted. Another cylinder connected to the arm lifts the cluster to a retracted position.

This equipment has undoubtedly improved efficiency in the automated milking environment, but nonetheless has certain shortcomings. One drawback is that the cylinder connected to the arm carrying the milking cluster must be manually moved into position on each occasion prior to milking. While effort is saved on the removal end, nothing in the automated operation aids the dairyman in the milking pit in prepositioning the milking cluster. While automated cluster attachment as well as take off remains a desirable but so far elusive goal, any steps taken in this direction are nonetheless helpful to the herdsman. Another problem is that different breeds of cows (e.g. Holstein, Brown Swiss, Guernsey, Jersey, Milking Shorthorn, etc.), and indeed individual cows, present their udders at different heights. Thus, while automated equipment may be installed for one height, it is difficult to preset ACR equipment so that the lowermost limit of travel may be adjusted to conform to different udder heights. Finally, in any effort to preposition milking clusters before milking, special care must be taken to avoid contact between the milking cluster and the floor of the milking parlor, which is presumably contaminated by feces or urine. To protect the cluster against contamination which would spoil the milk or spread infection to the cow's udder, the cluster must not be permitted to contact the floor or prematurely positioned where the cow could contaminate the cluster.

SUMMARY OF THE INVENTION

These and other objects are largely met by the present invention which automatically prepositions a milking cluster at a desired location prior to milking. That is to say, the present invention saves herdsman effort by automatically placing the milking cluster at a desired premilking location. It also permits adjustment of the premilking height for different preselected heights for the "average" udder height within the herd as well as final manual "fine-tuning" for individual cows with the weight of the milking cluster assembly effectively counterbalanced. It also retains the convenience of ACR equipment, while avoiding undesired contamination of the milking cluster. Furthermore, in the preferred embodiments, these objects are obtained by equipment which is rugged and fundamentally simple in design, and operates on pneumatic circuitry to limit the introduction of stray voltage into the milking parlor.

In the preferred embodiment of the automated milking cluster positioning apparatus of the present invention, an arm is provided for carrying a milking cluster for machine milking of a dairy animal, and the arm is coupled to a moveable member, such as a pneumatic cylinder.

The cylinder is shiftable through a range of motion between a first lower position and a second, upper or retracted position. A motor, broadly speaking, includes i pneumatic logic circuitry for receiving high pressure air and providing either high pressure or low pressure air to the cylinder. The pneumatic logic circuitry is actuated to exhaust the air provided to the cylinder and thereby lower the cylinder under the influence of gravity to a preselected height which is normally above the first lower position. When that preselected height is reached by the cylinder, a sensor, such as a valve switch, detects the position of the cylinder and causes the cylinder to stop at that preselected position. In particularly preferred embodiments, the sensor is a whisker valve which is engaged by the cylinder and enables low pressure air to reach the cylinder, thus counterbalancing the weight to maintain it at the preselected position. Most preferably, the whisker valve can be adjusted in position to allow the preselected height to be varied. Further, the position of the cylinder can be manually adjusted from the preselected position for a particular animal and the counterbalance is maintained at the manually adjusted position by the low pressure air. The arm is then placed below the udder for milking.

At the conclusion of milking, the preferred embodiment of the present invention automatically retracts the milking cluster to a start position. A folding arm is provided which is retracted to a folded position from under the animal's udder, and the pneumatic logic circuitry then admits high pressure air into the cylinder to raise it back to the second position. The apparatus hereof thereby enables automatic retrieval of the milking cluster after milking, as well as pre-positioning of the milking cluster prior to final positioning and attachment of the teat cups of the cluster on the animal's teats for milking. The apparatus and method of the present invention permits a larger number of animals to be milked or less labor for the dairyman.

These and other objects of the present invention will be appreciated by those skilled in the art by reference to the drawings and the description which follows.

BRIEF DESCRIPTION OF THE DRAWINGS

FIG. 3 is a schematic view of the present invention showing the air logic circuitry with high pressure air provided to the counterbalance cylinder and the retraction cylinder to return the milking cluster to an upper position;

FIG. 4 is a schematic view similar to FIG. 3, showing the exhaust of high pressure air during dropping of the counterbalance cylinder;

FIG. 5 is a schematic view similar to FIG. 3 showing the apparatus upon actuation of the sensor to position and maintain the counterbalance cylinder in at a preselected height;

FIG. 6 is a schematic view similar to FIG. 3 showing the apparatus in the counterbalance mode for manual adjustment in height to a particular animal;

DESCRIPTION OF THE EMBODIMENT

Figures 1, 2:
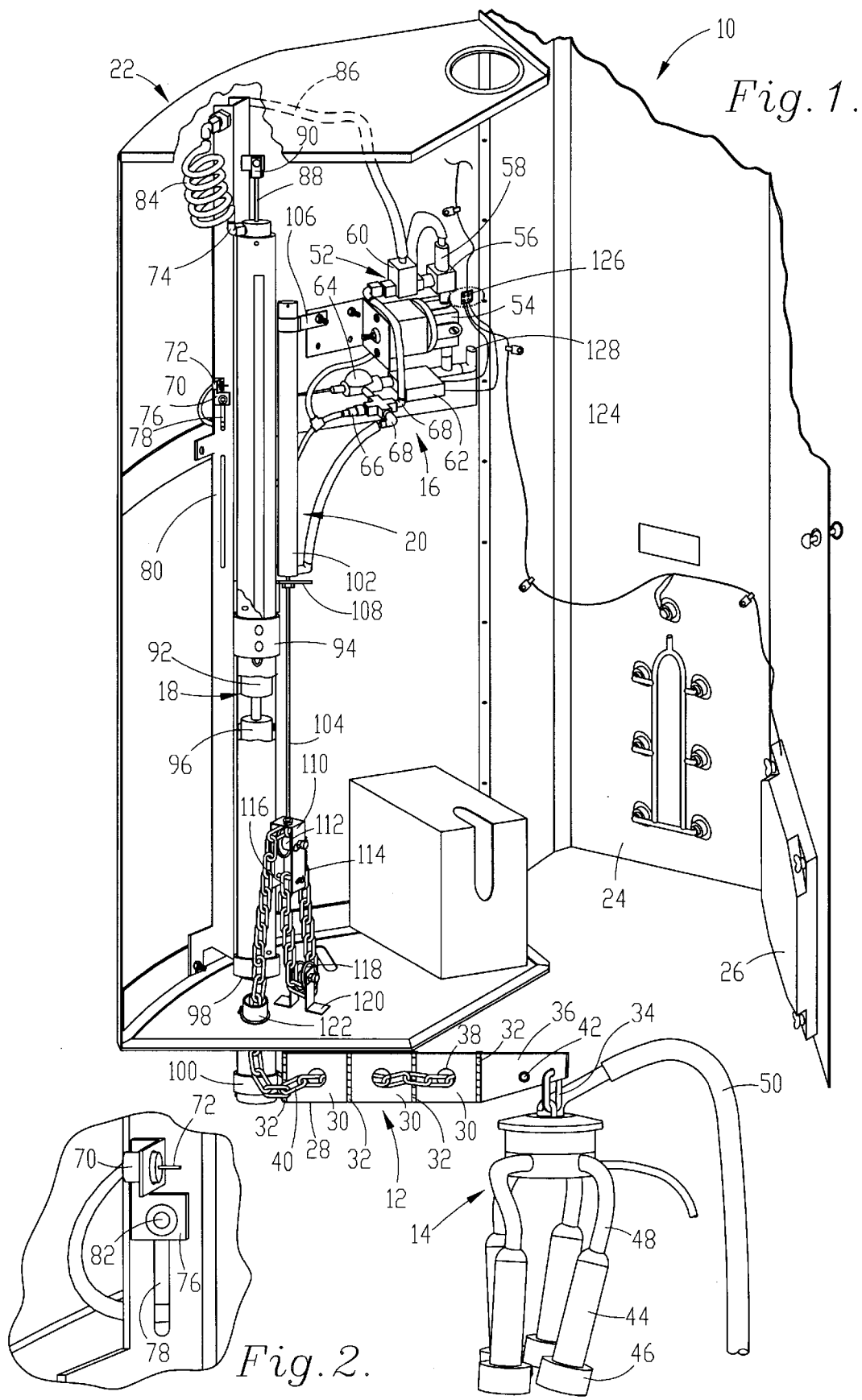
FIG. 1 is a perspective view of the preferred embodiment of the present invention, showing an automatic cluster retrieval unit with a counterbalance cylinder, a retraction cylinder, and an adjustable sensor for engagement with the counterbalance cylinder.
FIG. 2 is a fragmentary, enlarged perspective view of the sensor, showing the slot for adjustment of the sensor.

Referring now to the drawings, an automatic milking cluster height positioner 10 in accordance with the present invention 10 broadly includes an arm 12 for carrying a conventional milking cluster 14, a motor 16, a counterbalance cylinder 18 and a retraction cylinder 20. A cabinet 22 houses the motor 16 and includes a door 24 which carries control panel 26 including switches for actuation of the automatic control of the detachment of the milking cluster 14, retrieval of the milking cluster, and lowering of the counterbalance cylinder 18 to a preselected position. Such an apparatus, without the prepositioning feature of the present invention, have been sold by Alfa Laval Agri, Inc. of Kansas City, Mo. the assignee of the present invention, under the trademark PLATO, and include a milking point controller, air retraction cylinder, milk meter with integral milk line vacuum shutoff, solenoid valve and control valve, counterbalance cylinder and extension, and folding arm linkage.

In greater detail, the arm 12 is a folding arm 28 including arm plates 30 connected by hinges 32. A hanger 34 is provided on the remote plate 36 for carrying the milking cluster 14. The plates 30 include an aperture 38 for receiving a chain 40 therethrough, the chain being connected to remote plate 36 by pin 42.

Milking cluster 14 includes a plurality of teat cups 44 and, as is conventional, each teat cup 44 includes a resilient liner 46. Each of the teat cups is connected to the milking cluster through a long milk tube which provides a source of vacuum to both hold the teat cup 44 on the teat of the animal and to permit the flow of milk to the milking cluster 14. The milk then flows through the long milk tube 48 corresponding to each teat cup 44 to the milking cluster 14 and then through milk line 50 to a weigh meter or the like. The weigh meter is operatively coupled to the control panel 26 to signal when milk flow stops for initiating the detachment and removal sequence as is conventional. A pulsation line (not shown) is also preferably connected to each teat cup for providing alternate atmospheric pressure and vacuum to between the teat cup and the liner as is well known to those skilled in the art.

Motor 16 as used broadly herein includes pneumatic logic circuit 52 for supplying pneumatic power to the counterbalance cylinder 18 and the retraction cylinder 20. Pneumatic logic circuit 52 is shown schematically in FIGS. 3–6 and includes an air pressure regulator 54, such as high flow pressure air regulator Model 231-960-090-000 from Bellofram of Burlington, Mass. The regulator 54 is fluidically connected to three-way valve 56, such as normally open, 3-way spool valve Model MJV03 from Clippard Instrument Laboratory of Cincinnati, Ohio. The three-way valve 56 is provided with an air pilot actuator 58 such as Model MPA-3P from Clippard Instrument. Air from the three-way valve may also be supplied to shuttle valve 60, such as shuttle (double check) valve Model MJSV-1 from Clippard. High pressure air is routed to solenoid valve 62, and an exemplary solenoid is 3-way solenoid-operated valve Model 35A-AAA-DFEA-1BA from Mac Valves, Inc. of Wixom, Mich. A quick exhaust valve 64, such as, for example, Model SQE1 from Humphrey Products of Kalamazoo, Mich., is connected to the solenoid valve 62. Check valve 66 is positioned to prevent the flow of high pressure air from the line leading to whisker valve 70. An exemplary check valve is Model MCV-1 from Clippard Instrument Laboratory. Flow control valves 68 are positioned between the quick exhaust valve 64 and the retraction cylinder 20 and the shuttle valve 60 leading to the counterbalance cylinder 18 to regulate the speed of movement of the retraction cylinder and the counterbalance cylinder under high pressure air. A flow control valve 68 useful in connection with the present invention is Model 776556-11 from Legris, Inc. of Mesa, Ariz. which is an adjustable, meter-out, flow control valve.

An exemplary whisker valve 70 is provided by Clippard Instruments as Model MWV-1 and is a normally closed valve. The whisker valve is provided with a sensor 72 which is positioned to engage an outlet coupling 74 on counterbalance cylinder 18. As is shown in FIG. 2, the whisker valve 70 is supported by a bracket 76 which is held in position along a slot 78 in a cylinder support upright 80 mounted to the cabinet 22. A bolt 82 passes through the slot 78 and is secured by a wingnut or other fastener which may be loosened to slide the bracket 76 and thus the whisker valve 70 and its sensor vertically along the slot 78. The outlet coupling 74 is fluidically connected to the shuttle valve 60 by coiled air hose 84 and by suitable fittings and hose 86.

The counterbalance cylinder 18 includes a shaft 88 which is fixed at its upper end by a clevis 90 to cylinder support upright 80 and a body 92 which is vertically shiftable and receives outlet coupling 74 at the upper end thereof. One counterbalance cylinder found useful in the present invention is a double acting air cylinder Model No. D-57228-A from Bimba Manufacturing Co. of Monee, Ill. and which is provided with a 1½ inch diameter bore. A guide 94 is connected to support upright 80 to guide the vertical movement of the body 92. The bottom of the body 92 is connected to an extension 96 and passes through a bushing 98 located at the bottom of the cabinet 22. A collar 100 is attached to the bottom of the extension 96 to operatively connect the arm 12 to the counterbalance cylinder 18.

The retraction cylinder 20 includes a body 102 and a shaft 104. The body 102 is fixed relative to the cabinet by brackets 106 and 108, with the shaft 104 vertically reciprocal within the body 102. One unit useful as a retraction cylinder is a double acting air cylinder Model D-42294-A with a 1½ inch bore and a fourteen inch stroke from Bimba Manufacturing Co. The bottom end of the shaft 104 is coupled to a yoke 110 which carries a pulley 112 and a crosspin 114. The crosspin 114 is connected to the proximate link 116 of chain 40. A pulley 118 is secured by mount 120 to the bottom of the cabinet 22, and an adjacent sleeve 122 provides an opening in the cabinet 22 for the passage of the chain 40 therethrough for routing to and through the folding arm 28.

The control panel 26 is connected to the solenoid valve 62 by wire 124 connected through two pole terminal strip 126. The control panel 26 includes a button for actuating the milking sequence and optimally, though not necessarily, includes programmable functions for interfacing with milk meters as is well known in the art for milking delay, retraction delay, claw vacuum delays, milk sweep and delay settings for backflush, milk meter draindown and the like. In addition, an indicator light may be provided to alert the operator when the retraction delay begins.

The operation of the apparatus 10 hereof is shown in FIGS. 3–6. FIG. 3 illustrates the retraction sequence with the cross-hatched lines showing the presence of pressurized air. High pressure air (40 to 60 psi) is supplied at an inlet 128. Solenoid valve 62 is energized and opened, admitting the high pressure air to pass to retraction cylinder 20 through flow control valve 68. This causes the shaft 104 to retract into body 102 and pull upwardly on yoke 110. As yoke 110 moves up, it pulls chain 40 around pulleys 112 and 118 to retract folding arm 28 in an accordion-like manner so that plates 30 are flush against one another. Simultaneously, high-pressure air flows through check valve 66 to whisker valve 70 and acts on air pilot actuator 58 to keep three-way valve 56 in a closed position. High pressure air also flows through flow control valve 68 and shuttle valve 60 and is thus routed through coiled hose 84 to counterbalance cylinder 18. The flow of high pressure air to the counterbalance cylinder 18 acts on the upper surface of the body 92, forcing the body 92 upwardly to a retracted position, carrying the arm 12 with it. At the conclusion of the retraction sequence shown in FIG. 3, the folding arm 28 is fully collapsed and the counterbalance cylinder 18 has raised the folding arm 28 to its uppermost retracted position. This sequence is typically automatically initiated, as is common with ACR devices, by a reduced or terminated milk flow through the cluster 14 as sensed by a flow meter or weigh meter receiving milk from the milk line 50. The flow meter or weigh meter sends a signal to the control panel 26 which in turn actuates the solenoid valve 62 to admit high pressure air as described above. At the same or an earlier time, the vacuum to the teat cups is ceased, and the teat cups 44 falls out of attachment to the animal's teats to permit the milking cluster 14 to clear the udder and be retracted as described above.

The extension sequence is shown in FIG. 4. When the dairyman wants to initiate milking, he depresses a button on the control panel which signals the solenoid valve 62 to close. This shuts off the flow of high pressure air to the flow control valves 68. The high pressure air in the system, except for that between the check valve 66, the air pilot actuator 58, and the whisker valve 70, is exhausted through quick exhaust valve 64. By exhausting the air as shown by the arrows, air leaves the body 92 of the counterbalance cylinder 18, which thus lowers because of its weight, carrying the folding arm 28 and the milking cluster 14 with it. While the counterbalance cylinder 18 is moving downwardly, the air hose 84 extends. Check valve 66 maintains high pressure air in the circuit to the whisker valve 70 and to air pilot actuator 58 to hold the three-way valve 56 closed. The weight of the shaft 104 and chain 40 causes the shaft 104 of the retraction cylinder 20 to extend.

FIG. 5 shows the initiation of the counterbalance sequence. The whisker valve 70 is positioned within the slot 78 at a predetermined location corresponding to the desired milking position for the arm 12. When the sensor 72 is engaged by the outlet coupling 74 connected to the body 92 of the counterbalance cylinder, high pressure air is exhausted through the whisker valve 70. This causes a loss of pressure to the air pilot actuator 58 and the three way valve 56 is thereby moved into the position permitting low pressure air from the regulator 54 (about 20 psi) to flow through the three way valve 56. This shifts the shuttle valve 60 to permit air to flow through the shuttle valve 60 and the air hose 84 to the counterbalance cylinder 18. The low pressure air provides sufficient lift against the weight of the body 92 of the counterbalance cylinder 18, arm 12 and milking cluster 14 to stop the downward movement and maintain the counterbalance cylinder at the desired predetermined position. The dairyman may then extend the folding arm 28 to position the milking cluster 14 beneath the animal's udder by pulling on the remote plate 36 or the milking cluster 14 as high pressure air held in the retraction cylinder 20 is exhausted. In the absence of the initiation of the stopping and maintaining of the counterbalance cylinder by the low pressure air, the body 92 may carry the arm 12 and the milking cluster 14 the full length of travel permitted by the counterbalance cylinder to a lowermost position. Thus, the counterbalanced position represents a third position intermediate the first lowermost position and the second, uppermost and fully retracted position of the counterbalance cylinder 18 and arm 12.

FIG. 6 shows the condition of the air logic circuit during final adjustment and milking of the animal. While the sensor 72 of the whisker valve 70 may be preset for an average or otherwise desired position for most cows or other animals to be milked, either in the entire herd or for that particular milking stall, it may be appreciated that minor adjustments may be desired for the height of the udders of individual cows. The counterbalance cylinder 18 and arm 12 may be further manually positioned by the dairyman by manually moving the arm 12 up or down to prevent excess pulling by the teat cups 44 on the teats of the animal. When the arm is moved down, low pressure air is pushed back out from the counterbalance cylinder 18 through the regulator 54 and the counterbalancing of the arm 12 is thereafter maintained. When additional elevation of the arm 12 and milking cluster 14 is desired, the arm 12 may be pushed up to permit additional air to enter into the body 92 of the counterbalance cylinder and maintain its position. When the animal has given all her milk and milk flow falls off or stops, the weigh meter or flow meter signals to the control panel to actuate the solenoid valve 62 and retract the cylinder as described above.

Figure 7:
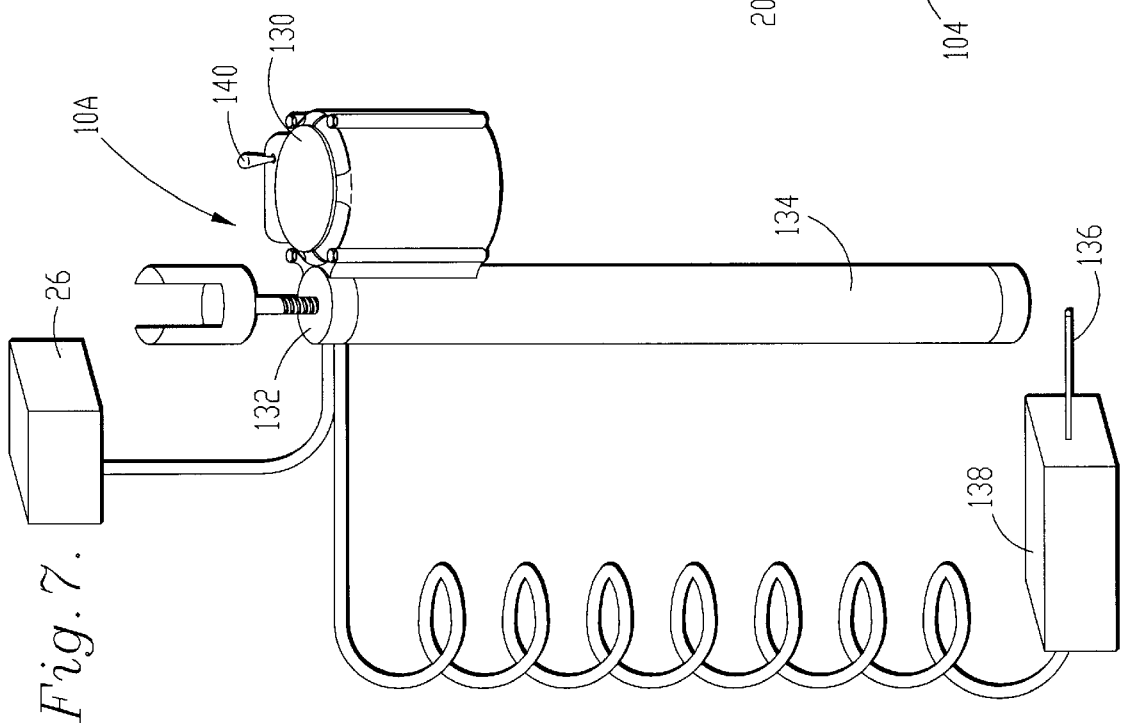
FIG. 7 is a fragmentary schematic view of an alternate embodiment employing an electrical motor to raise and lower the cylinder carrying the arm.

FIG. 7 illustrates schematically an alternate embodiment 10A of the present invention. While it is desirable to minimize electricity in the milking parlor due to the effects of stray voltage to the animal, it is understood that an electric motor 130 may be substituted for the pneumatic motor 16, and a screw drive ram cylinder 132 for counterbalance cylinder 18. Upon initiation of the retraction signal from the control panel 26, the motor 130 may drive the ram 132 upwardly to retract the arm 12 coupled thereto in a similar manner as shown in FIG. 1. When the dairyman pushes the button on the control panel 26 to lower the arm 12, the motor 130 reverses direction and drives the body 134 of the ram 132 downwardly. When the body 134 engages the sensor 136 of switch 138, a signal is sent to the motor 130 to stop, with the screw drive of the ram 132 holding it in position. It is to be understood that the sensor 136 and switch 138 may be adjustably positioned in a slot 78 as shown in FIG. 1, so that the lowered position of the ram body 134 may be preselected and adjusted as described above. For final positioning, a toggle switch 140 may be operatively connected to the motor to move the ram body 134 up or down, carrying the arm 12 and milking cluster 14 with it.

Figure 8:
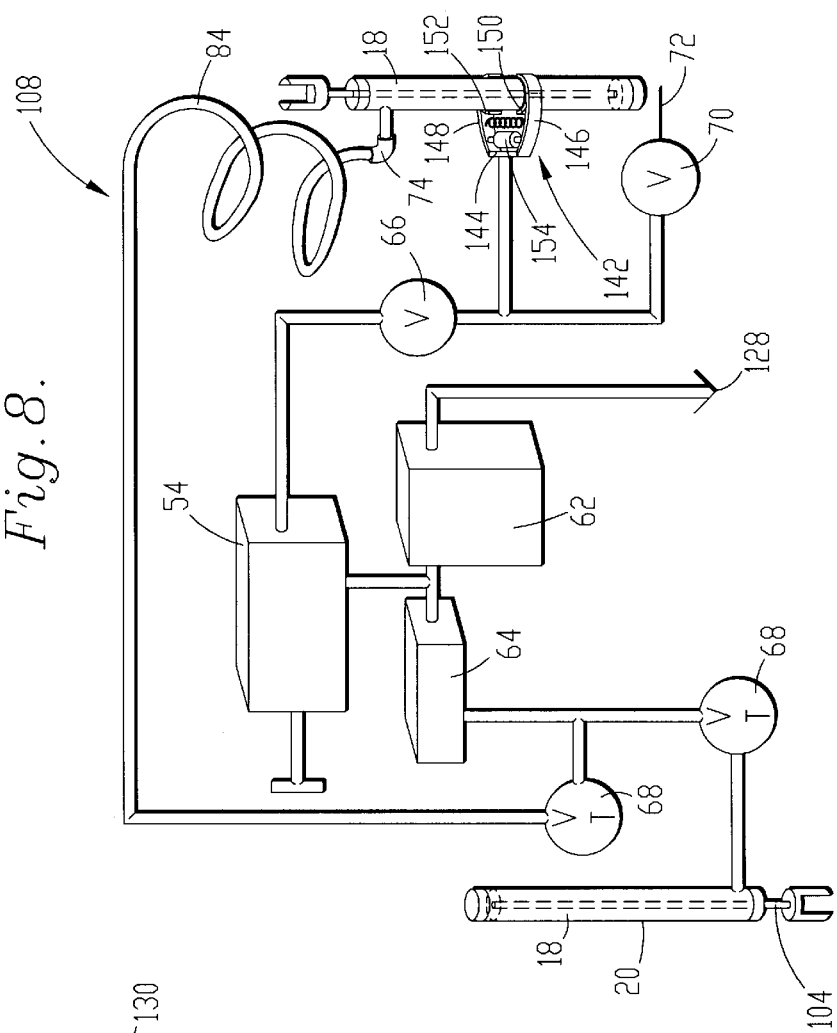
FIG. 8 is a fragmentary schematic view of a second alternate embodiment employing a brake to position and maintain the cylinder.

FIG. 8 illustrates a further alternate embodiment 10B of the invention hereof, wherein the position of the counterbalance cylinder is maintained by a brake 142. Like components bear similar reference characters to those described above in connection with FIGS. 1–6. Brake 142 as illustrated includes a caliper brake 144 having a pair of arms 146 and 148 each provided with a brake pad 150 at the remote end thereof. The arms 146 and 148 are normally held closed by a spring 152 positioned therebetween. The arms 146 and 148 may be expanded by an air actuated cylinder 154 having an inner piston expansible under the influence of pressure. As illustrated in FIG. 8, at the end of milking, the control panel 26 initiates a signal to the solenoid 62 to introduce high pressure air to the retraction cylinder 20 and the counterbalance cylinder 18 as described above. The introduction of high pressure air past check valve 66 also reaches whisker valve 70 and air actuated cylinder 154, causing the latter to open arms 146 and 148 releasing the brake 142 from engagement with the counterbalance cylinder 18. When the dairyman desires to begin milking a cow, he pushes a button on the control panel 26 causing the solenoid valve 62 to close and shut off the flow of high pressure air. Remaining air in the system, except for either low pressure (when regulator 54 is employed as shown) or high pressure air between the check valve 66, whisker valve 70, and air actuated cylinder 154, is exhausted through quick exhaust valve 64 as described above, permitting the shaft 104 of the retraction cylinder 20 and the counterbalance cylinder 18 to move in a downward direction under the influence of gravity. As the counterbalance cylinder falls the outlet coupling 74 from the pneumatic motor engages sensor 72 of whisker valve 70. This exhaust air from the whisker valve 70, allowing the air actuated cylinder 154 to collapse the arm 146 and 148 of brake 142 around the counterbalance cylinder 18. The spring 152 is of sufficient tension to hold the counterbalance cylinder 18 and the attached weight of the arm 12 and milking cluster 14 in position,but may be overcome manually to push the arm up or down. At the conclusion of milking the solenoid valve 62 is signaled to admit high pressure air from inlet 128 and the process is repeated.

In each of the embodiment shown, it is to be understood that the cylinder is capable of greater travel than the preselected position of the sensor. Thus, the lowermost position and the upper, retracted position represent a range of travel, with the counterbalanced position corresponding to the sensor placement representing a third, intermediate position.

Various modification of the present invention are well within the skill of those in the art. For example, either the retraction cylinder or the counterbalance cylinder could be inverted so that either the shaft or the body of the cylinder could reciprocate. In addition, other sensors, such as electric eyes or light beam could readily be substituted for the mechanical sensor illustrated. Thus, although preferred form of the invention have been described above, it is to be recognized that such disclosure is by way of illustrated only, and should not be utilized in a limiting sense in interpreting the scope of the present invention. Obvious modification to the exemplary embodiment, as hereinabove set forth, could be readily made by those skilled in the art without departing from the spirit of the present invention.

The invention hereby state their intent to rely on the Doctrine of Equivalents to determine and asses the reasonable fair scope of their invention as pertain to any apparatus not materially departing from but outside the liberal scope of the invention as set out in the following claims.

We claim:

1. An apparatus for positioning of a milking cluster at a preselected location for milking an animal comprising:

means for carrying a milking cluster;

an upright guide;

a body operably coupling said carrying means and guide;

a motive assembly for selectively downwardly translating said guide carrying means along the length of the guide through a range between an upper position and a lower position; and means for selectively stopping the translational descending movement of the carrying means and body at a preselected position intermediate the upper and lower positions, including a sensor engageable by said body during said translational descending movement thereof, a sensor mount for selective vertical movement of the sensor and positioning thereof at any one of a number of locations, and means operably coupling said sensor and motive assembly for stopping the descending translation of the body and carrying means upon engagement of the sensor by said body, said motive assembly having structure for holding said body at said third, preselected position.

2. An apparatus as set forth in claim 1, wherein said motive assembly includes a pneumatic motor, the pneumatic motor including a valve shiftable from a first position for directing air at a first, higher pressure for moving said carrying means and body from said preselected intermediate position to said upper position and a second position for directing air at a second, lower pressure for locating and maintaining said carrying means and body at said preselected intermediate position.

3. An apparatus as set forth in claim 2, wherein said pneumatic motor includes an exhaust valve operatively coupled with said sensor for exhausting higher pressure air between said shiftable valve and said exhaust valve upon detection by said sensor of said carrying means moving downwardly to said preselected intermediate position.

4. An apparatus as set forth in claim 3, wherein said carrying means includes a foldable arm, and including means for retracting said foldable arm during movement of said coupling means from said third position to said second position.

5. The apparatus of claim 1, said motive assembly including a pneumatic motor.

6. The apparatus of claim 1, said sensor comprising a whisker valve.

7. The apparatus of claim 1, said carrying means comprises a foldable arm, there being means for selective extension and retraction of said foldable arm.

8. An apparatus for positioning of a milking cluster at a preselected location for milking an animal comprising:

means for carrying a milking cluster;

an upright guide;

a body operably coupling said carrying means and guide;

a motive assembly for selectively downwardly translating said guide and carrying means along the length of the guide through a range between an upper position and a lower position; and means for selectively stopping the translational descending movement of the carrying means and body at a preselected position intermediate the upper and lower positions, including a sensing assembly comprising a sensor and a sensible surface, one of said sensor and surface being mounted for descending translational movement with the carrying means, the other of said sensor and sensor surface mounted for sensing by the sensor during said descending translational movement of the carrying means, one of said sensor and surface being selectively vertically adjustable for positioning thereof at any one of a number of locations, said sensing assembly operatively coupled with motive assembly for stopping the descending translation of the body and carrying means when the sensor senses said surface, said motive assembly having structure for holding said body at said third, preselected position.

\* \* \* \* \*